US005200684A

United States Patent [19]
Fisher

[11] Patent Number: 5,200,684
[45] Date of Patent: Apr. 6, 1993

[54] ELECTRICAL MOTOR MONITORING SYSTEM FOR A DOMESTIC APPLIANCE

[75] Inventor: Clarence H. Fisher, Royalton Township, Berrien County, Mich.

[73] Assignee: Whirlpool Corporation, Benton Harbor, Mich.

[21] Appl. No.: 706,259

[22] Filed: May 28, 1991

Related U.S. Application Data

[63] Continuation of Ser. No. 503,139, Mar. 30, 1990, Pat. No. 5,075,613, which is a continuation of Ser. No. 182,509, Apr. 18, 1988, abandoned.

[51] Int. Cl.$^5$ .............................................. H02P 5/40
[52] U.S. Cl. ................................... 318/809; 318/729; 68/12.01
[58] Field of Search ..................... 318/809–810, 318/729, 786, 778; 68/12.01, 12 R, 207; 34/30, 43, 44; 307/116, 149

[56] References Cited

U.S. PATENT DOCUMENTS

| | | |
|---|---|---|
| 3,652,462 | 3/1972 | Dieterich et al. |
| 4,355,274 | 10/1982 | Bourbeau ............... 318/729 |
| 4,412,389 | 11/1983 | Kruger . |
| 4,433,276 | 2/1984 | Nola ...................... 318/729 |
| 4,454,462 | 6/1984 | Spann ..................... 318/729 |
| 4,469,998 | 9/1984 | Nola ...................... 318/729 |
| 4,481,786 | 11/1984 | Bashark .................. 68/12 R |
| 4,483,082 | 11/1984 | Ellingson . |
| 4,649,654 | 3/1987 | Hikino et al. . |
| 4,738,034 | 4/1988 | Muramatsu et al. ........ 34/43 |
| 4,767,975 | 8/1988 | Unsworth ............... 318/729 |
| 4,862,710 | 9/1989 | Torita et al. ............ 68/12 R |
| 4,914,833 | 4/1990 | Pilolla et al. ............. 34/44 |
| 5,031,337 | 7/1991 | Piolla et al. ............. 34/44 |
| 5,038,091 | 8/1991 | Bashark .................. 318/809 |

FOREIGN PATENT DOCUMENTS 2210422 11/1983 United Kingdom .

Primary Examiner—Paul Ip
Attorney, Agent, or Firm—Hill, Steadman & Simpson

[57] ABSTRACT

A drive system for an automatic washer or dryer having a rotatable drum about a horizontal axis. An induction motor drives the drum and is connected to and disconnected from a source of alternating voltage by a microprocessor to control the speed of the motor. The microprocessor senses the zero crossing of the alternating voltage and the zero crossing of alternating current flowing in the motor to determine the time to connect the motor to the alternating voltage. The microprocessor analyzes successive readings of the motor's back emf to detect undesirable load distributions and effect redistribution.

14 Claims, 4 Drawing Sheets

ELECTRICAL MOTOR MONITORING SYSTEM FOR A DOMESTIC APPLIANCE

BACKGROUND OF THE INVENTION

The present invention relates in general to an appliance, such as an automatic washer particularly to an appliance having a clothes holding drum which rotates about a horizontal axis.

A typical automatic dryer for drying articles such as clothes has an outer cabinet, a rotatable drum driven by a motor within the cabinet, a fan for drawing air in through the cabinet and passing it to the drum and a discharge duct for exhausting the air from the drum to the atmosphere. Usually, dryers of this type have one or more electrical heating elements located in the inlet air duct to heat the air before it passes to the drum. Alternatively, the heat is supplied from a source of gas. Conventionally, dryers of this type have a main on/off switch and an adjustable timer so that a user can select any one of a range of drying times. A heating control switch ultimately varies the amount of time power is supplied to the heating elements. Prior art automatic washers also have a rotatable drum or washtub within a cabinet.

Modern automatic washers and dryers typically are microprocessor controlled and the number of actual controls which the user has access to is less than the number of controls for older type dryers. Prior art control circuits for dryers using a microprocessor typically have involved complex circuitry. The present invention provides a simpler solution to the problem of providing a circuit in a microprocessor controlled dryer or washer for controlling the motor.

SUMMARY OF THE INVENTION

The present invention involves a drive system for an automatic washer or dryer having a drum rotatable about a horizontal axis. An induction motor drives the drum and is connected to and disconnected from a source of alternating voltage. When the zero crossing of the alternating current flowing in the motor is sensed, the back emf of the motor is digitized via an A/D. Successive digitizations when processed, yield valuable motor loading information useful in correcting the drying or washing process.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
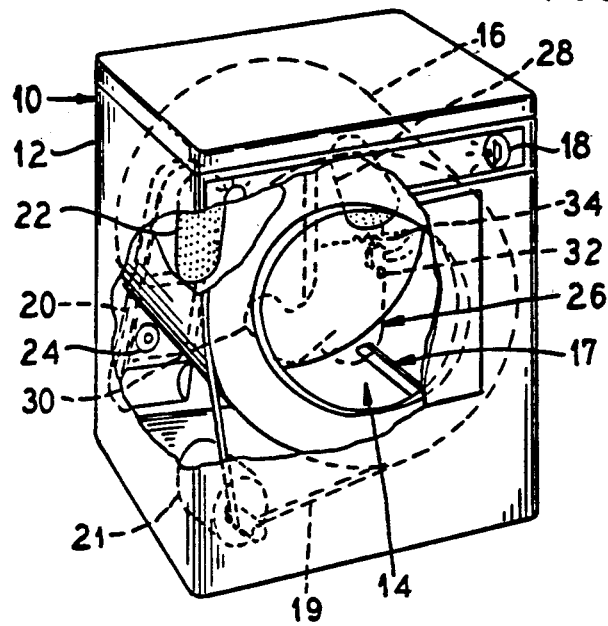
FIG. 1 is a perspective view, partially cut away of an automatic clothes dryer utilizing the present invention.

The present invention has general applicability but is most advantageously utilized in an appliance, an example of which is shown in FIG. 1. It is to be understood that the present invention also has use in an automatic washer, but the present invention will be described as used primarily in an automatic clothes dryer, which constitutes the preferred embodiment.

A clothes dryer 10 has an outer cabinet 12 with an access port 14 in a front of the cabinet 12. Within the cabinet 12 there is provided a clothes tumbling drum 16 mounted for rotation about a horizontal central axis. The drum 16 is cylindrical in shape and has paddles 17. The drum 16 is driven by a belt 19 which is connected to a motor 21 as is known in the art.

The clothes dryer 10 is typically provided with a control arrangement such that an operator, by manually setting a control knob 18 and activating a push to start switch (not shown) causes the machine to start and automatically proceed through a desired drying cycle.

The clothes dryer 10 is provided with an inlet duct 20 which has a cover grill 22 out of which air flows after being heated by a heating element 24 in the inlet duct 20. A blower housing assembly 26 is also provided and air from the drum 16 exits through a cover grill 28 through a discharge duct 30 and out to the atmosphere. Within the discharge duct 30 a thermostat 32 is located and adjacent the thermostat is a bias heater 34. A blower motor (not shown) causes air to be pulled out of the drum 16 thus causing the air to flow through the inlet duct 30. As the air exits the drum 16 it flows over the thermostat 32. The thermostat 32 has a predetermined set point at which it will cause the heating elements 24 in the inlet duct to turn off. For example, the thermostat may be set at 75° C. The thermostat is heated by both the air flowing out of the drum 16 and by the bias heater 34. A microprocessor via a control circuit operates the motor 21 as well as the thermostat 32 and bias heater 34 to effect proper drying of a load of clothes.

The present invention is most advantageously utilized in the control of an induction motor used in an automatic washing machine and/or an automatic clothes dryer.

Figure 2:
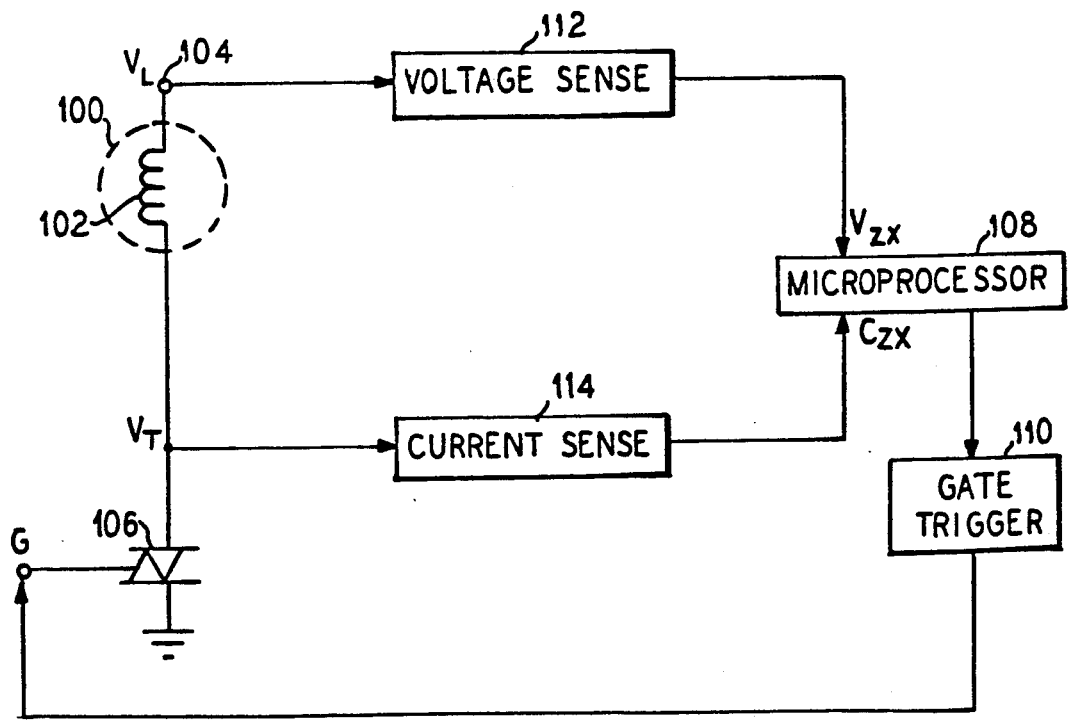
FIG. 2 is a general block diagram of the circuit used in the FIG. 1 dryer.

FIG. 2 is a schematic block diagram of an induction motor 100 having a winding 102 connected to an alternating voltage, $V_L$, at terminal 104, and via a triac 106 to ground or the neutral of the alternating voltage. As is well known in the art, the motor 100 may be controlled by means of a microprocessor 108 via a trigger boost circuit or control circuit 110 which is connected to a gate G of the triac 106. The microprocessor 108 causes a signal from the control circuit 110 to be applied to the gate G of the triac 106 typically during each half cycle of the alternating voltage $V_L$. Once the triac 106 is triggered into conduction, and a current flows through the winding 102, thus energizing the motor 100, the triac 106 will continue to conduct until the next zero crossing of the current. The amount of time after the zero crossing at which the triac is re-triggered into conduction affects the speed of the motor 100.

Figure 3:
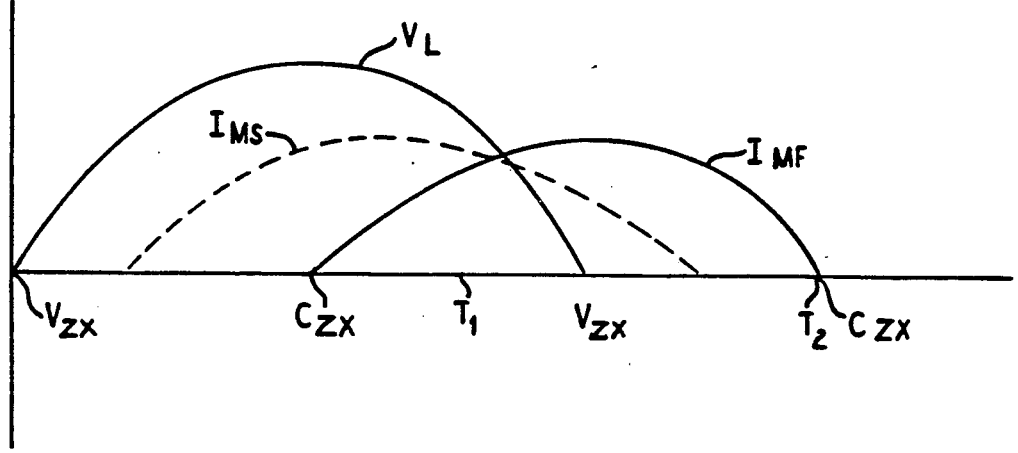
FIG. 3 is a graph of voltage and current waveforms in the FIG. 2 circuit.

As shown in FIG. 3, the voltage $V_L$ may be sinusoidal, having a zero voltage level or a zero crossing at $V_{zx}$. The current which flows through the winding 102 of the induction motor 100 is out of phase with the applied voltage $V_L$ and when the motor is operating at a high speed, may be represented for example by the "fast" curve $I_{mf}$ and when the motor is operated at a low speed may be represented by the "slow" curve $I_{ms}$. For a particular operation and speed of the motor 100, for example, the triac 106 may be triggered into conduction at point in time $T_1$. At a later point in time $T_2$, corresponding to the zero crossing of the current, the triac 106 will turn off. The zero crossing of the current through the winding 102 is referred to in FIG. 3 as $C_{zx}$. The time from the zero crossing of the current $C_{zx}$ until the following triggering at time $T_1$ of the triac 106 may be a fixed value or may be a variable value which is determined by the microprocessor from other parameters.

The induction motor 100 has a speed which may be controlled by maintaining the timing interval between the zero current crossing $C_{zx}$ and the moment of triggering $T_1$. As explained above, the time interval between the voltage zero crossing $V_{zx}$ and the current zero crossing $C_{zx}$ is shorter for a motor losing speed. In other words, the current lags the voltage by a smaller phase angle amount and thus $C_{zx}$ moves closer to $V_{zx}$. When triggering is based on a fixed time interval from $C_{zx}$ the triggering also moves to the left in FIG. 3 for a motor losing speed. This triggers the triac 106 earlier in time, which will make the motor speed up. These two opposing conditions, therefore, cause the motor to seek equilibrium. It can be seen that this condition can occur at every half line cycle.

As shown in FIG. 2, circuit block 112 senses the zero crossing of the supply voltage $V_L$ and provides an output signal, $V_{zx}$, indicative of this to the microprocessor 108. Circuit block 114 determines the zero crossing of the current flowing through winding 102 from the voltage $V_T$ across the triac 106 and produces the signal $C_{zx}$ for the microprocessor 108.

Figure 4:
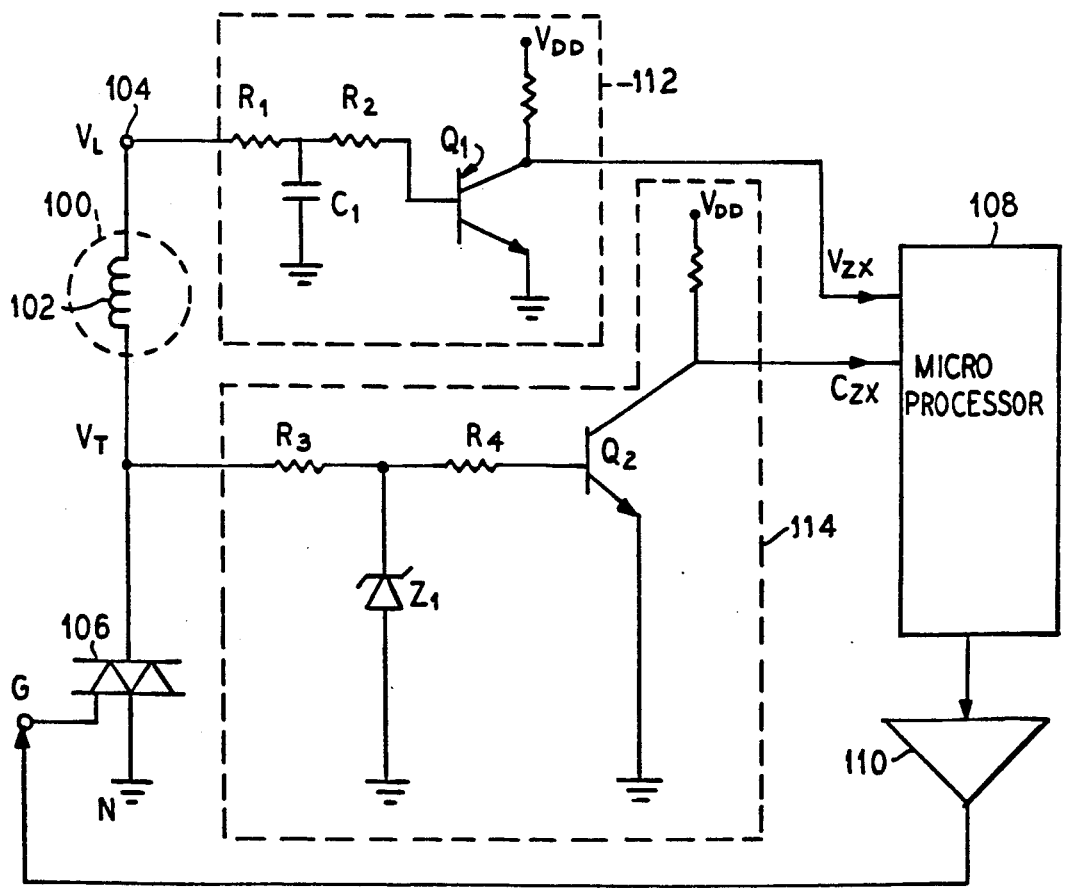
FIG. 4 is a more specific circuit diagram of the FIG. 2 circuit.

As shown in FIG. 4 the voltage zero crossing sensor 112 is connected directly to the line voltage $V_L$ at terminal 104. The line voltage $V_L$ is connected via resistors and capacitor R1, R2 and C1 as shown in FIG. 3 to the base of a transistor Q1. As the voltage at $V_L$ rises above ground, Q1 becomes forward biased and turns on, pulling its output, $V_{zx}$ to ground. The current sensing block 114 has its input connected to receive the voltage $V_T$ and when the triac 106 is conducting negative current $V_T$ is negative which keeps transistor Q2 in an off condition. The base of transistor Q2 is connected through resistors R3 and R4 to the voltage $V_T$. When the triac 106 goes into the nonconducting state, the voltage $V_T$ rises, thereby forward biasing Q2 which pulls its output $C_{zx}$ to ground. Thus, the time between $V_{zx}$ being pulled to ground and the time $C_{zx}$ is pulled to ground is a function of motor speed and loading. This information can then be used by the microprocessor 108 to determine the time of triggering triac 106 through the circuit 110. As stated above, the motor 100 can be caused to keep a constant speed in consideration of changing load conditions or can be caused to accelerate or decelerate depending upon the application. The microprocessor 108 is not described or shown in detail as there are many suitable microprocessors available which can be easily programmed by one skilled in the art.

Figure 5:
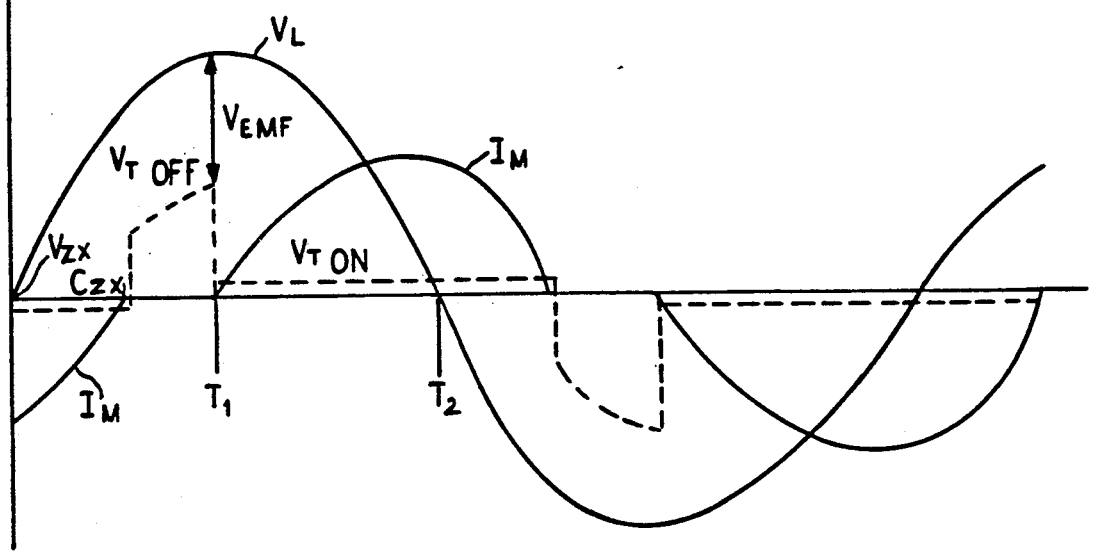
FIG. 5 is a more detailed graph of voltage and current waveforms in the FIG. 4 circuit.

FIG. 5 shows a more detailed graph of the voltages in the FIGS. 2 and 4 circuits. As was stated above, as long as there is sufficient current flowing through the triac 106, the polarity of the voltage $V_T$ across the triac is always in phase with the current flowing through the triac and the winding 102. For example, when the motor-triac current flows from $V_L$ to N, $V_T$ is greater than or equal to $+1.6$ volts. This biases transistor Q2 and turns on Q2 thereby pulling $C_{zx}$ low. Conversely, when the motor-triac current flows up from N to $V_L$, $V_T$ is less than or equal to $-1.6$ volts. Transistor Q2 is off and $C_{zx}$ is held high. It is to be noted that both the positive current zero crossings and the negative current zero crossings can be detected with this circuit.

Zener diode $Z_1$ as shown in FIG. 4 prevents excessive power dissipation in the base of the transistor $Q_2$. During times when the triac 106 is in an off condition and the voltage $V_T$ approaches the line voltage $V_L$, excessive voltage levels which could stress the transistor Q2 are diverted through the Zener diode $Z_1$.

As can be seen in FIG. 5, the voltage $V_T$ changes state between a near zero level and a higher level at each zero crossing of the current flowing through the triac 106 and the winding 102.

The voltage, $V_T$, across the triac 106 provides certain information which may be utilized by the microprocessor in operating the automatic dryer and/or washer. For example, if $V_T$ is significantly less than $V_L$ because of the motor 100's large back EMF, this indicates to the microprocessor that the motor is running. If the voltage $V_T$ is approximately equal to the voltage $V_L$ because of a decrease in the back EMF of the motor, this result indicates to the microprocessor that the motor is in a locked rotor position. This is so because when the induction motor is running there is always a certain amount of what may be referred to is as a back EMF. This can be seen in FIG. 5 as a difference $V_{EMF}$ between $V_L$ and $V_T$. Also, if the motor 100 is jammed, the back EMF of the motor will be small, which in turn means that $V_T$ will be very large.

The circuit and method described above can be used to sense and redistribute an unbalanced load of clothes in either an automatic washer or an automatic dryer which has a rotation about a horizontal axis. Thus, the load in the appliance may be distributed evenly before accelerating to a high speed. The voltage $V_T$ off (see FIG. 5) varies as a function of rotor speed in an induction motor. The harder the motor is working, for example, when it is lifting an unbalanced load of clothes, the slower the rotation and the closer to applied line voltage $V_T$ off approaches. When variations in successive measurements of $V_T$ off exceed some threshold limit, an unacceptably balanced distribution of the clothes load has been detected. In order to effect the redistribution of this unbalanced load, a time is determined at which the speed of the rotating drum is to be suddenly slowed or suddenly accelerated. Sudden slowing of the drum causes the clump of clothes to begin to fall off one of the paddles that is lifting it. Since the items in this group of clothing are not all equally distant from the bottom of the drum towards which they are falling, the sudden increasing of the surface speed to which the items are falling tends to spread out the items. Breaking and accelerating of the drum can be controlled by the microprocessor 108. Since it is possible now to evenly balance the clothes in a horizontal axis washer, higher spin rates are possible as compared to prior art devices.

Figure 7:
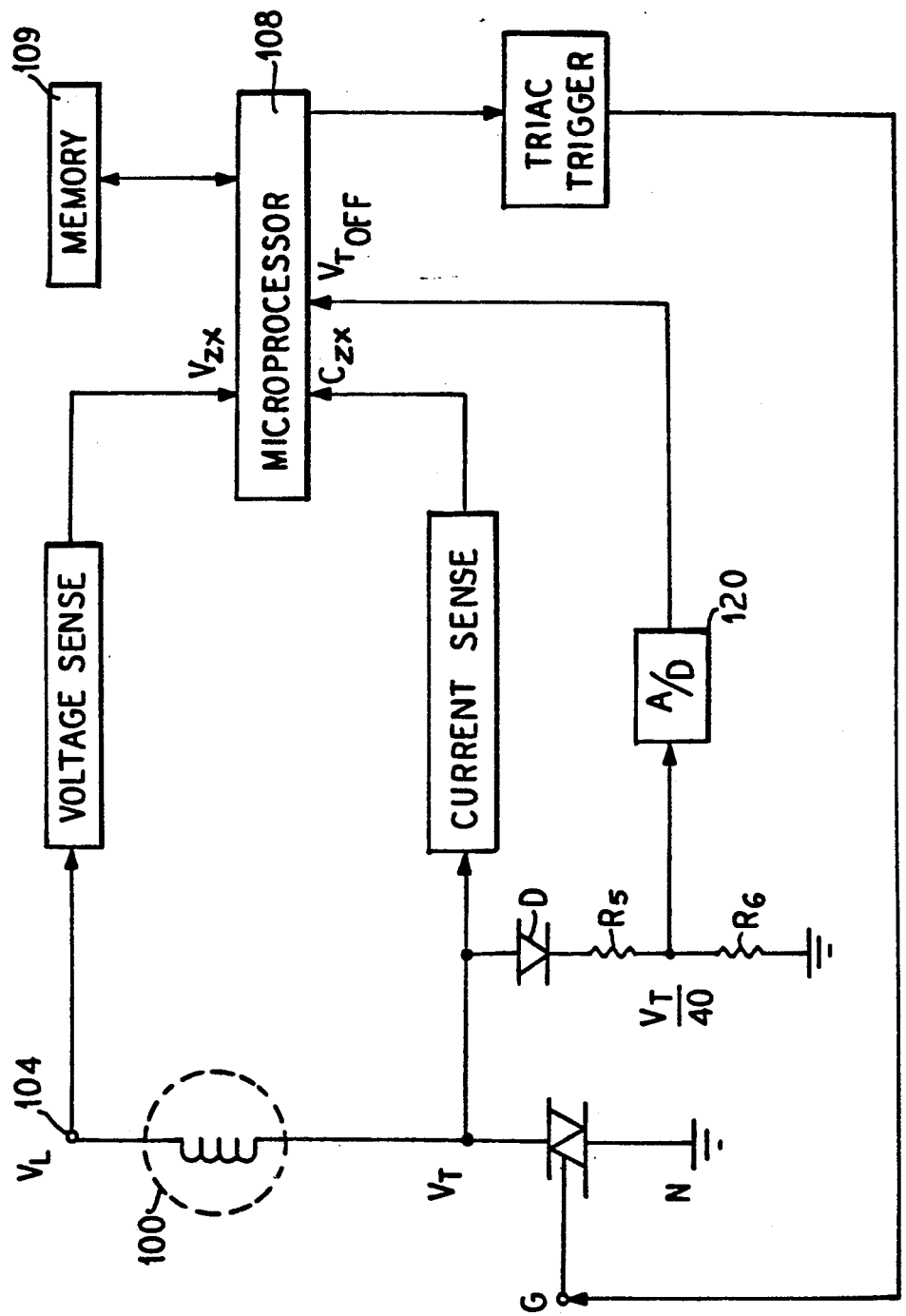
FIG. 7 is a block diagram of an alternative embodiment of the present invention.

In another embodiment of the present invention, illustrated in FIG. 7, it is possible to predict the drying time of a load of clothes in an automatic dryer. As shown in FIG. 7, the voltage VT is connected to a diode D, and a resistor network $R_5$, $R_6$ is connected to an eight bit analog-to-digital converter 120, which receives an input approximately equal to $V_T/40$. The output of the converter 120 is the value V-TRIAC-OFF. This output is read by the microprocessor 108 and successive readings are stored internally. The microprocessor 108 accesses a memory 109 in which is stored the data for different drying curves.

Figure 6:
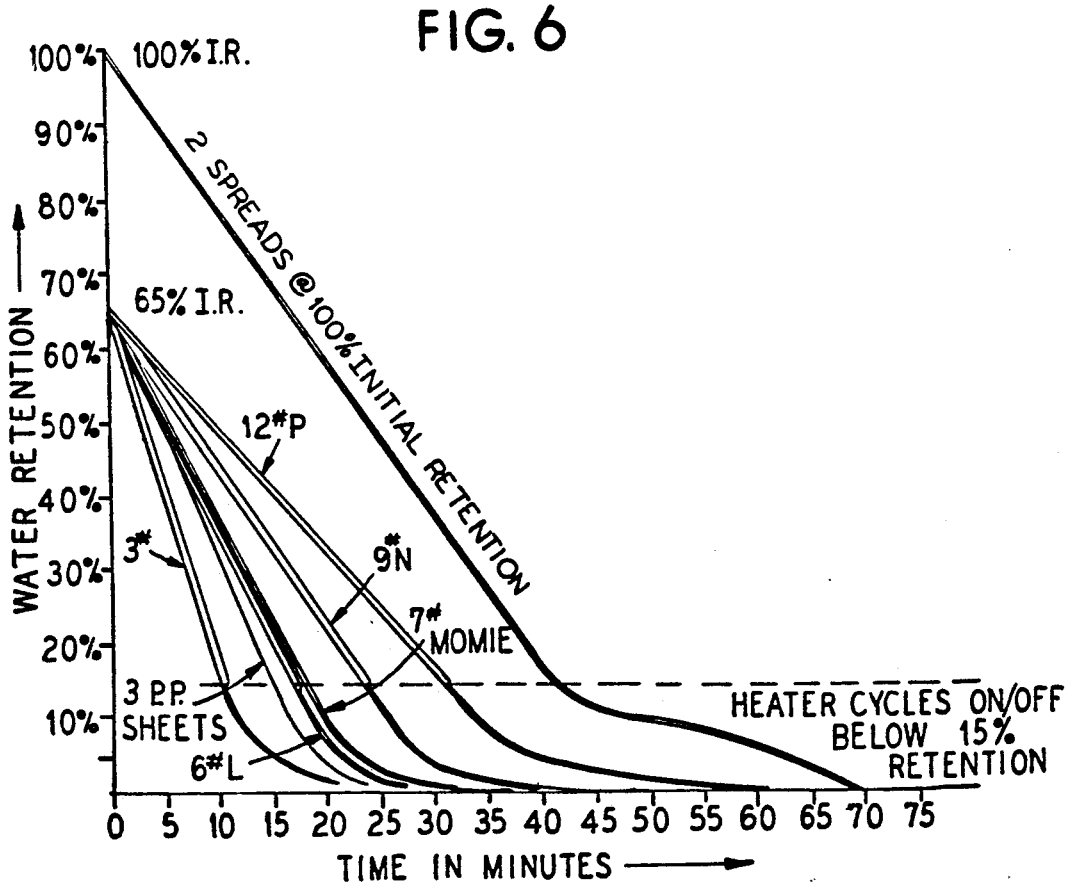
FIG. 6 is a graph depicting the drying time for different loads of clothes in an automatic dryer.

Every load of clothes dries at a rate which is determined by its size and character. Larger loads take longer than small loads, cottons take longer than synthetics, and bulky loads take longer than shears. The graph shown in FIG. 6 shows the time versus water retention for different sizes and types of materials in loads. The microprocessor memory 109 contains data with respect to the rate of drying for different types of loads. This data may be empirically prepared by experimentally weighing the clothes every few minutes and graphing the water retention versus time. From this data an extrapolation can be made as to when the clothes should be dry. The slope of the graph is a function of the rate that water is being removed. It has been found that these graphs follow a linear curve quite closely as the clothes are tumbled, for example, in a horizontal axis automatic dryer. When the heater coils in a dryer are cycled on and off, nonlinearities are introduced into the curve of the graph. To finish drying a load of clothes, an additional drying time period is added on according to the operator's dryness selection. From the graph of FIG. 6 it can be seen that loads of 3#, 6#, 9# and 12# take about 9 minutes longer to dry for each 3# increment from a 65% retention level to a 15% retention level.

The present invention implements the above method to effect the drying of loads as follows: From a stopped drum position, the voltage $V_T$ is digitized by converter 120 to provide a direct measurement of line voltage and then the drum is started. When the clothes fall off a paddle, the motor will attain full speed. The voltage $V_T$ across the triac after the triac has commutated off will be at a minimum value, V triac-off-min, indicating maximum speed has been achieved. The clothes will be lifted in a clump by a paddle until several tumbles have occurred and will slow the motor down in proportion to the weight of the load. When the motor has slowed to a minimum speed, the voltage $V_T$ across the triac will be at a maximum value, V triac-off-max, indicating maximum lift. The magnitude of the difference between V-triac-off-max and V-triac-off-min, adjusted for line voltage variations, will be a function of the load weight.

The calculated difference is stored by the microprocessor as the initial weight of the load. The microprocessor next takes at least two successive measurements of V-triac-off. If the first measurement of V-triac-off-max minus V-triac-off-min is large, then the microprocessor can assume the load contains much water and wait, for example, for 10 minutes before stopping the drum and taking another measurement of load weight. If the initial value of V-triac-off-max minus V-triac-off-min is small, then the load contains less water and another measurement can be taken, for example, after 5 minutes.

Successive measurements of V-triac-off-max minus V-triac-off-min are taken to determine data points that will define a graph of the rate of change of the percentage of water retention versus time. These can be matched with one of, for example, 16 different drying curves stored in the memory of the microprocessor. From a look-up table and the operator's selected degree of dryness desired, the time remaining until the load is dry can be predicted. As a check, V-triac-off-max minus V-triac-off-min will approach zero as the load becomes dry. This is because a dry load tumbles with much, much less clumping than a wet load, thereby applying a more constant loading to the motor.

In addition, the present invention can estimate time remaining to dryness, and can detect an empty drum. Furthermore, the present invention can detect a broken belt, in which case the drum is not turning. Additionally, the present invention can detect a jammed or locked rotor by detecting that the value $V_{T\,off}$ exceeds a predetermined threshold value.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

The embodiments of the invention in which an exclusive property or privilege is claimed are defined as follows:

1. A drive system for an automatic appliance having a drum rotatable about a horizontal axis, comprising:
   an induction motor mounted within the appliance;
   an alternating voltage/current source operatively coupled to said motor;
   means for linking said motor to said drum;
   means for connecting sad motor to said voltage/current source at a point in time T1 and for disconnecting said motor at a next zero crossing of said alternating current;
   means for sensing said alternating current flowing in said motor and providing a current signal indicative of a zero crossing of said alternating current;
   means for sensing said alternating voltage and providing a voltage signal indicative of a zero crossing of said alternating voltage;
   means for digitizing a voltage across said means for connecting and disconnecting said motor to said alternating voltage which simplicity measures said motor's back emf, and providing a digital output;
   a microprocessor receiving said voltage signal, said current signal, and said digital voltage providing a trigger signal at an output thereof connected to a control input of said means for connecting and disconnecting, said microprocessor providing said trigger signal at said point in time T1 to said means for connecting and disconnecting after receiving said current signal indicative of a zero crossing of said alternating current, said microprocessor having an nut coupled to said means for digitizing and including means for storing a plurality of digital outputs for a time interval between said point in time T1 and a last previous zero crossing of said alternating current, said microprocessor determining said motor emf from said digitized voltages to monitor at least one appliance operating condition so that said appliance operating condition is controlled directly.

2. The drive system described in claim 1, wherein said appliance is a dryer and said appliance operating condition is a drying rate for a load of clothes therein, and said microprocessor has a memory for storing data including the drying rate related to a weight of the load of clothes in said dryer, said microprocessor outputting a signal indicative of said weight from a plurality of voltage and current signals and from said plurality of said stored digital outputs.

3. The drive system described in claim 2, wherein said microprocessor selects one of a plurality of drying rates form said memory as a function of said plurality of said digital outputs.

4. The drive system described in claim 1, wherein said means for connecting and disconnecting said motor to said voltage/circuit source is a triac receiving said trigger signal on a gate thereof, said trigger signal being a pulse of sufficient duration to cause said triac to be conductive.

5. The drive system described in claim 1, wherein the time from a zero crossing of said alternating current to said time T1 is fixed.

6. The drive system described in claim 1, wherein the time from a zero crossing of said alternating current to said time T1 is a variable which is changed by said microprocessor so as to control the speed of said motor.

7. The drive system described in claim 1, wherein said appliance is a washer and said appliance operating condition is load distribution of clothes therein, and for an unevenly distributed load of clothes said microprocessor outputs trigger signals to said means for connecting and disconnecting said motor to accelerate and decelerate said motor thereby to redistribute said load of clothes, said microprocessor detecting said unevenly distributed load of clothes from said voltage and current signals and said plurality of digital outputs across said means for connecting said motor to alternating voltage, whereby said microprocessor redistributes said load of clothes before the washer is operated in a high spin mode.

8. A drive system for an automatic dryer having a drum rotatable about a horizontal axis, comprising:
   an induction motor mounted within the dryer;
   an alternating current/voltage source operatively coupled to said motor;
   means for linking said motor to said drum;
   means for sensing alternating current flowing in said motor and providing a current signal indicative of a zero crossing of said alternating current;
   means for sensing said alternating voltage and providing a voltage signal indicative of a zero crossing of said alternating voltage;
   a triac connecting said motor to said alternating current/voltage source at a time T1 and disconnecting said motor at a next zero crossing of said alternating current;
   means for digitizing a voltage across said triac and providing a digital output; and
   a microprocessor operatively coupled to receive said current signal, said voltage signal, and said digital output, said microprocessor providing a trigger signal to sd triac at said time T1 after receiving said current signal indicative of a zero crossing of said alternating current, said trigger signal being a pulse of sufficient duration to cause said triac to be conductive,
   said microprocessor storing a plurality of said digital outputs for a time interval between said point in time T1 and a last previous zero crossing of said alternating current, said microprocessor providing an output signal and said current signal, said microprocessor utilizing said digital outputs to determine motor emf and to monitor at least one appliance operating condition.

9. The drive system described in claim 8, wherein said microprocessor has a memory for storing data including at least one drying rate related to the weight of a load of clothes in said dryer, said microprocessor determining said weight from a plurality of voltage and current signals.

10. The drive system described in claim 8, wherein said microprocessor utilizes said digital outputs to generate a signal indicative of the weight of load of clothes.

11. The drive system described in claim 10, wherein said microprocessor selects one of a plurality of drying rates as a function of said plurality of said digital outputs and outputting a signal indicative of a duration of time predicting when the load of clothes should be dry.

12. The drive system described in claim 11, wherein for an unevenly distributed load of clothes said microprocessor causes said motor to accelerate and decelerate to redistribute said load of clothes, said microprocessor identifying said unevenly distributed load of clothes from a plurality of said digital outputs.

13. The drive system described in claim 8, wherein the time from a zero crossing of said alternating current to said time T1 is fixed.

14. The drive system described in claim 8, wherein the time from a zero crossing of said alternating current to said time T1 is a variable which is changed by said microprocessor so as to control the speed of said motor.

* * * * *